(12) United States Patent
Fulcomer et al.

(10) Patent No.: US 6,314,162 B1
(45) Date of Patent: Nov. 6, 2001

(54) DIGITAL TELEPHONE LINK MARGIN VERIFICATION

(75) Inventors: Emanuel James Fulcomer; Paul Benjamin Newland, both of Monmouth County, NJ (US)

(73) Assignee: Avaya Technology Corp, Basking Ridge, NJ (US)

( * ) Notice: Subject to any disclaimer, the term of this patent is extended or adjusted under 35 U.S.C. 154(b) by 0 days.

(21) Appl. No.: 09/293,718

(22) Filed: Apr. 16, 1999

(51) Int. Cl.$^7$ ............................................. H04M 1/24
(52) U.S. Cl. ..................... 379/24; 379/1.01; 379/9; 379/10.01; 379/15.01; 379/22; 379/27.01
(58) Field of Search ................ 379/1, 6, 27, 28; 371/1.01, 9, 9.02, 9.06, 10.01, 12, 15.01, 15.03, 22.04, 22.05, 24, 27.01, 27.03, 28, 29.01

(56) References Cited

U.S. PATENT DOCUMENTS

| | | | |
|---|---|---|---|
| 4,625,077 | * 11/1986 | Biffle et al. | 379/28 |
| 5,063,563 | * 11/1991 | Ikeda et al. | 379/26 |
| 5,473,666 | * 12/1995 | Szczebak, Jr. et al. | 379/3 |
| 5,768,684 | * 6/1998 | Grubb et al. | 455/13.4 |
| 6,061,427 | * 5/2000 | Ryoo | 379/1 |
| 6,226,356 | * 5/2001 | Brown | 379/24 |

* cited by examiner

Primary Examiner—Curtis Kuntz
Assistant Examiner—Quoc D. Tran
(74) Attorney, Agent, or Firm—Howard R. Popper

(57) ABSTRACT

A line circuit for serving a digital telephone set over a link of indeterminate length and attenuation characteristics includes a processor for issuing test messages over the link to the telephone set and which responds to the receipt of an acknowledgment message from the telephone set by inserting increasing amounts of finite attenuation into the link until the acknowledgment message fails to be received, at which point the value of inserted attenuation is a measure of the excess link margin.

1 Claim, 1 Drawing Sheet

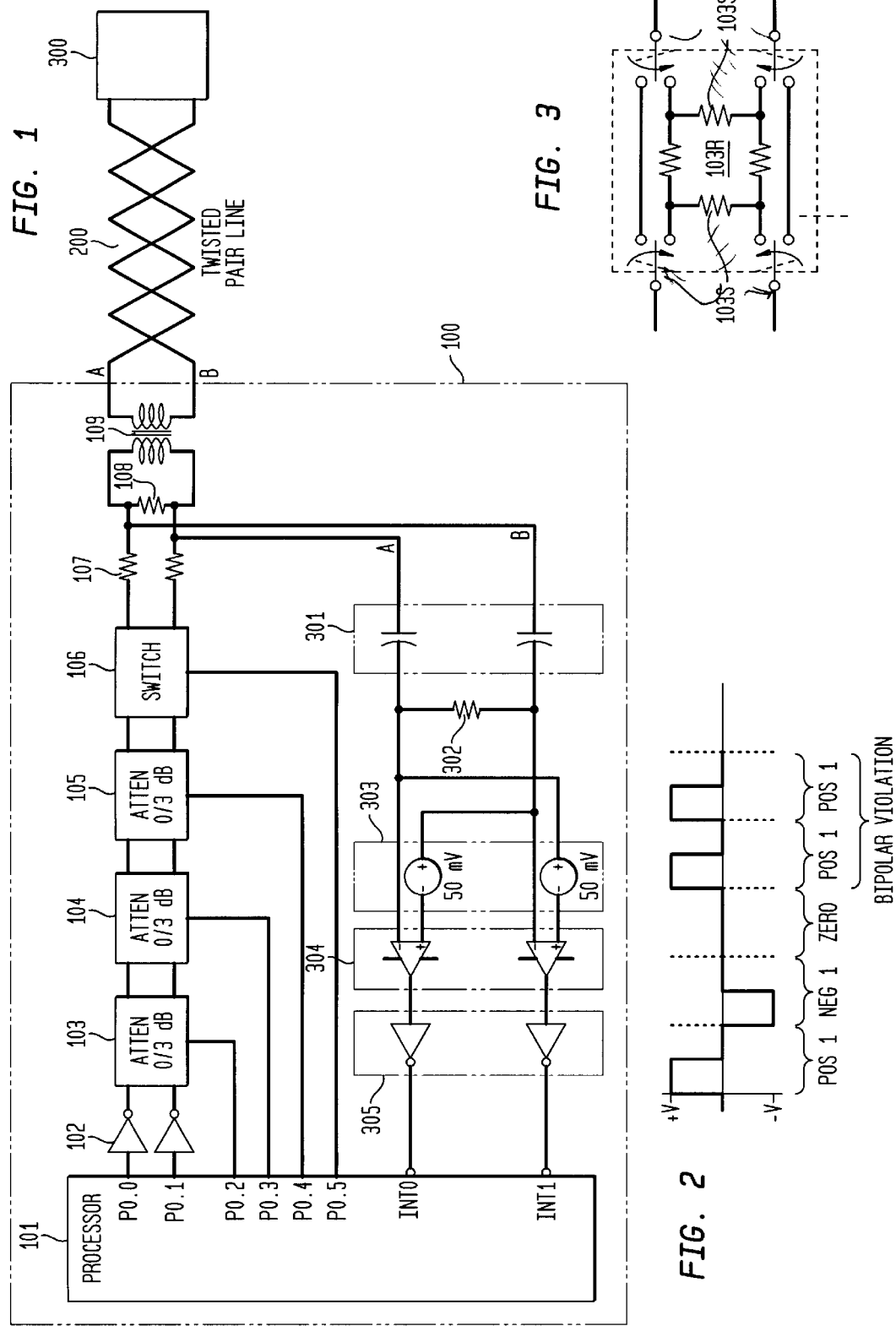

DIGITAL TELEPHONE LINK MARGIN VERIFICATION

FIELD OF THE INVENTION

This invention relates to digital telephone systems and, more particularly, to the measurement of link margin between a digital PBX line circuit and a telephone set.

BACKGROUND OF THE INVENTION

The transmission medium extending between a line circuit in a switching facility such as a PBX, key service unit or central office and a telephone set must provide a communications link that provides a minimum level of attenuation and impairment in order to assure reliable two-way communications. Among other things, the transmission equipment and protocol determine the minimum signal level threshold required to assure reliable communication over links of varying length and impairments.

Typically, when a digital telephone set is installed on a line which connects it to switching equipment (central office, PBX, key system, etc.) the installer is not provided with a means to determine how well the communications path between switch and telephone set are functioning. The telephone set either works flawlessly or doesn't work at all. Only rarely will the telephone set exhibit marginal performance. These characteristics are due to the nature of digital communications and are well understood in the industry. As long as the data are received above some minimum signal to noise threshold the receiving device works flawlessly. In linear systems with Gaussian noise, the difference in signal to noise ratio between nonoperation and flawless operation of a digital receiving device may be as small as ½ dB. This invention provides a means for an installer (as well as a maintenance center or even the user) to measure and determine a figure of merit regarding the performance of the link between telephone set and switching equipment at installation time, or any time thereafter. If the figure of merit is low, the installer can then investigate the reason for that low figure of merit or turn the matter over to another organization that may have greater expertise and/or more extensive test and diagnostic equipment to correct the situation.

SUMMARY OF THE INVENTION

In accordance with the principles of our invention, in one illustrative embodiment thereof, the transmit path of a PBX line circuit serving a digital telephone set is equipped with a series of switchable attenuators that can selectively be inserted at the output of the digital transmitter under the control of a processor to temporarily reduce the transmitted signal to determine if that reduced transmit level remains adequate to ensure reliable communications with the telephone set. The processor sends a test message over the line to the telephone set. If the test signal is received correctly, the telephone set returns an acknowledgment message with normal (maximum) signal level, within a predetermined interval. The PBX line circuit processor responds to the telephone set's answering message by switching in an attenuator to lower the transmit level of the next test message to be transmitted over the line from the PBX to the telephone set. If the telephone set detects the test message it again responds with an acknowledgment message. The PBX line circuit processor responds to this second acknowledgment message by inserting additional attenuation in the transmit path that will further lower the level of the next test message to be transmitted over the link to the telephone set. This process is repeated until the test message signal level is lowered so much that it is not correctly decoded by the telephone set. When the telephone set fails to return an acknowledgment signal within the required response time, the PBX line circuit processor removes all the inserted attenuation, thus returning the system to normal operation. The maximum amount of attenuation that could be inserted at the PBX line circuit's output and still have the telephone set respond to test messages is the figure of merit for the link between the PBX and the telephone set. In this manner the figure of merit can be determine and reported to the installer. If it is too low, the installer can then take corrective action. The same process can be used to determine the figure of merit for the telephone set transmitting to the PBX.

BRIEF DESCRIPTION OF THE DRAWING

The foregoing and other features of the invention may be better understood from a reading of the ensuing description together with the drawing, in which FIG. 1 shows the components of an illustrative digital line circuit including a processor and switchable attenuators for serving a telephone set according to the invention;

FIG. 2 shows waveforms of illustrative signals that compose the signal set; and

FIG. 3 shows the details of an illustrative switchable attenuator.

GENERAL DESCRIPTION

Referring now to FIG. 1 there are shown portions of a digital telephone line circuit 100 that are relevant to an illustrative implementation of our invention. Line circuit 100 serves a digital telephone set 300 typically over a local link 200 via the tip and ring conductors of a twisted pair line. Line circuit 100 may be located in a PBX, key system or a central office and includes a processor or ASIC (application specific integrated circuit) 101 for generating and receiving the signals required to implement the invention.

When a line circuit is first placed into operation, the installer merely hooks up the telephone and determines that it either works or doesn't work It is therefore possible that an installer could hook up a telephone at a location where there is only 1 dB of excess gain in the system. Another way of describing excess gain is to appreciate that if the line had 1 dB more attenuation the system would not work. It is an aspect of this invention to enable the installer to determine the excess gain, i.e., how close the system is to the threshold of not working, before concluding that the system is working properly and turning it over to the user. In accordance with our invention, as shown in the illustrative embodiment, a processor 101, such as that normally employed in the line circuit to perform conventional signal processing on the digital voice signals destined for, or received from, link 200 is now called upon to perform some additional functions. When line circuit 100 is first connected to telephone set 300, telephone 300 will not send packets over link 200 to line circuit 100 until it has first received packets from line circuit 100, obtained synchronization and "locked" on. At this point telephone set 300 would begin to send packets to line circuit 100 which, in turn, would "lock" to the packets received from telephone set 300. When packets are received at terminals INT0, INT1 of line circuit 100's processor 101, processor 101 sends a status request message to telephone set 300. Telephone 300 interprets the status request message as a command to respond with an acknowledgement.

The test message would advantageously be sent when processor controls attenuator array 103–105 to insert some minimum attenuation in series with the link at the transmitter output so that test message is sent over the link at some maximum level. Attenuator array 103–105 may be implemented with one attenuator capable of only two attenuation values or by a large number of attenuators with each attenuator providing a large number of possible attenuation values. An individual attenuator of attenuator array 103–105 may advantageously be implemented as shown in FIG. 3. Attenuator 103 is there shown as including a four resistor "O" pad 103R and two "double pole, double throw" switches 103S controlled from processor terminals P2. Processor terminals P3–P4 would control corresponding switches (not shown) in attenuators 104 and 105. Attenuator switches 103S may advantageously be implemented in silicon, by electromechanical means, or any other means. Attenuator resistors 103R, etc., may be implemented in silicon, by carbon film resistors, or by any other means, provided the loss which they introduce remains reasonably constant over the range of signal levels and frequencies employed in the line circuit.

If the acknowledgement message is received within the appropriate time window, processor controls attenuator array 103–105 to insert some amount of attenuation in series at the transmitter output and sends another test message over the link to the telephone set 300. This process is repeated until processor 101 fails to receive an acknowledgment message. At this point, processor removes all attenuation. Processor has now determined the "go/no-go" threshold for link.

It the above description it was assumed that the test signal was sent over link 200 to the telephone set from processor terminals P0, P1. It may be desirable for the acknowledgment signal returned by the telephone set to be received at processor terminals INT0, INT1. In order to accommodate this, processor 101, after issuing the test signal at its terminals P0, P1, activates its control terminal P5 to control switch 106 to isolate the circuitry to its left from link 200 so that the acknowledgment signal returned by telephone set 300 is not attenuated by the shunting or loading produced by attenuator array 103–205. The acknowledgement signal according is applied over capacitors 301 to the inputs of receive amplifiers 304 whose outputs are connected to processor terminals INT0, INT1. Resistor 108 terminates link 200, its value determined by taking into account the impedance of the line and the turns ratio of transformer 109 which is used to ensure that the transmission line remains balanced and provides an impedance transformation that may be necessary to facilitate matching the electronics devices to the twisted pair line. The specifications of the transformer and the implementation of the transformer are not deemed to be important to the invention. Capacitors 301 are used to block high impedance DC bias signals of the detector from being shunted by the windings of transformer 109. Resistor 302 provides a high impedance shunt across the line and provides a DC path between the inputs of the comparators at 304. The offset generators at 303 ensure that the signal at the input to either comparator must exceed some value (50 mV as shown) before the output of the comparator becomes active (active high).

It may be desirable that messages referred to above make use of a signal set as shown in FIG. 2. In this example, a positive voltage of unity during the first half of the bit time, and zero voltage during the second half of the bit time are used to signify a logic 1. Additionally, a negative voltage of unity during the first half of the bit time, and zero voltage during the second half of the bit time are used to signify a logic 1. Additionally, zero voltage during the first half of the bit time, and zero voltage during the second half of the bit time are used to signify a logic 0. An additional rule may be applied such that under normal circumstances the transmitter shall transmit logic 1s by means of sending signals of alternating voltage polarity. An additional rule may be applied such that under special circumstances the transmitter shall transmit logic is by means of the same polarity for two consecutive logic 1 symbols (commonly known to the industry as a bipolar violation). An additionally rule may be applied such that when 5 consecutive zeros have been transmitted the next bit shall be considered a "stuffed" bit and shall be absorbed by the receiver regardless of value. The stuffed bit shall always be transmitted by the sending device as a logic 1 and shall make use of a voltage pulse of the opposite polarity of the last logic 1 transmitted.

A logic one by means of a positive polarity would be transmitted by the processor doing the following. At the conclusion of the prior bit time the outputs P0 and P1 would be at zero volts and the output of the inverters 102 would be high and the voltage at the output of the transformer 109 would be zero volts. At the beginning of the bit time the processor would set P1 high and leave P0 low, causing the output of the lower inverter 102 to be low, thus creating a positive pulse at the output of the transformer 109. At the mid point of the bit time the processor would return P0 to a logic 0, causing both inverters 102 to have high outputs and the voltage at the output of the transformer 109 would be zero.

A logic one by means of a negative polarity would be transmitted by the processor doing the following. At the conclusion of the prior bit time the outputs P0 and P1 would be at zero volts and the output of the inverters 102 would be high and the voltage at the output of the transformer 109 would be zero volts. At the beginning of the bit time the processor would set P0 high and leave P1 low, causing the output of the upper inverter 102 to be low, thus creating a negative pulse at the output of the transformer 109. At the mid point of the bit time the processor would return P0 to a logic 0, causing both inverters 102 to have high outputs and the voltage at the output of the transformer 109 would be zero.

A logic zero by means of zero voltage be transmitted by the processor simply leaving the outputs P0 and P1 at zero volts, as they were set during the last half of the prior bit time. When the voltage across R302 is zero then for each comparator the positive input will be 50 mV more negative than the negative input and the output of the comparator will be low. When a positive pulse is presented to the input of the detector (A positive with respect to B), if that pulse develops more than 50 mV across resistor 302, then the output of the lower comparator 304 becomes active (high) and the output of the lower inverter 305 will go low, causing an interrupt to be generated within the processor. Processor 101 can then time the duration of the pulse, compare it to the time lapsed since the arrival of the prior pulse, and determine if this pulse is the opposite polarity or the same polarity as the prior pulse.

When a negative pulse is presented to the input of the detector (A negative with respect to B), if that pulse develops more than 50 mV across resistor 302, then the output of the upper comparator 304 becomes active (high) and the output of the upper inverter 305 will go low, causing an interrupt to be generated within the processor. Again, processor 101 can time the duration of the pulse, compare it to the time lapsed since the arrival of the prior pulse, and determine if this pulse is the opposite polarity or the same polarity as the prior pulse, etc.

What has been described is applicable to a two wire line circuit which supports bi-directional communication over a single tip and ring pair. It should be appreciated that the principles thus described can also be applied to a four-wire line circuit in which two pairs of unidirectional two wire links are employed. Thus, in a four-wire arrangement switch 106 would not be needed since, in a conventional four-wire transmission system data is transmitted continuously, and without discontinuity, from source to receiver. In such an arrangement it would be advantageous, after the above procedure has been completed, for processor to send a message to telephone set 300 to "test link margin and report maximum allowable attenuation for communications". The telephone set 300 would then follow the above procedure to set the telephone set 300 transmitter attenuator as needed and send commands to the line circuit 100, asking the line circuit 100 to send an acknowledgement message if it hears the telephone set 300's command message. At the end of the telephone set 300's testing it would report to the line circuit 100 a result message that included the above discussed figure of merit, concluding the test process. A small value of allowable attenuation (or large difference in attenuation reported by telephone set 300 vs line circuit 100) would indicate a potential problem with the communications link.

What is claimed is:

1. A line circuit for serving a digital telephone set over a link of indeterminate length, comprising:
   a) an attenuator capable of reducing the signal level applied to said link; and
   b) a processor for repetitively:
      i) applying a test signal to said attenuator for transmission over said link;
      ii) determining whether any response to said test signal is obtained from said link within a predetermined time; and
      iii) selectively controlling said attenuator to insert an increment of attenuation to reduce said signal level applied to said link in response to the receipt of said any response to said test signal; and
      iv) removing the last increment of inserted attenuation when no response is received over said link within said predetermined time.

* * * * *